US008378780B2

(12) United States Patent
Hanada et al.

(10) Patent No.: US 8,378,780 B2
(45) Date of Patent: Feb. 19, 2013

(54) CONNECTED SENSOR SYSTEM, NETWORK UNIT, AND SENSOR UNIT

(75) Inventors: Tomoki Hanada, Osaka (JP); Koji Fukumura, Osaka (JP)

(73) Assignee: Keyence Corporation, Osaka (JP)

( * ) Notice: Subject to any disclaimer, the term of this patent is extended or adjusted under 35 U.S.C. 154(b) by 265 days.

(21) Appl. No.: 12/818,254

(22) Filed: Jun. 18, 2010

(65) Prior Publication Data

US 2011/0018688 A1    Jan. 27, 2011

(30) Foreign Application Priority Data

Jul. 24, 2009    (JP) ................................. 2009-173755

(51) Int. Cl.
*G05B 23/02* (2006.01)
*G06F 13/12* (2006.01)
*G06F 13/38* (2006.01)
*G01C 19/00* (2006.01)
*G01C 25/00* (2006.01)
*G01D 18/00* (2006.01)
*G01F 25/00* (2006.01)
*G06F 19/00* (2011.01)

(52) U.S. Cl. ............. 340/3.3; 710/63; 702/104; 702/122
(58) Field of Classification Search .................... 340/3.3; 702/104, 122; 710/63
See application file for complete search history.

(56) References Cited

U.S. PATENT DOCUMENTS

| | | | |
|---|---|---|---|
| 6,556,935 B2 * | 4/2003 | Morimura et al. | 702/104 |
| 7,006,942 B2 * | 2/2006 | Fukumura | 702/122 |
| 7,091,854 B1 * | 8/2006 | Miao | 340/539.26 |
| 7,793,017 B2 * | 9/2010 | Gehring et al. | 710/63 |
| 2010/0308210 A1 * | 12/2010 | Saitou et al. | 250/208.2 |

FOREIGN PATENT DOCUMENTS

| | | |
|---|---|---|
| JP | 09-252242 | 9/1997 |
| JP | 2003-108204 | 4/2003 |
| JP | 2004-304825 | 10/2004 |
| JP | 2006-003136 | 1/2006 |

* cited by examiner

*Primary Examiner* — Benjamin C Lee
*Assistant Examiner* — Adam Carlson
(74) *Attorney, Agent, or Firm* — Kilyk & Bowersox, P.L.L.C.

(57) ABSTRACT

The present invention provides a connected sensor system which can be easily used by the user and which can give an external input to each sensor unit without making the wiring complicated, and also provides a network unit and a sensor unit used for the connected sensor system. A cyclic communication memory of a network unit is arranged with an external input request region, and an external input signal is stored to a corresponding memory in a host control apparatus. By performing cyclic communication between the network unit and the host control apparatus, the external input signal is stored to the cyclic communication memory of the network unit. Accordingly, the external input signal is transmitted to each sensor unit connected to the network unit, and each sensor unit executes the external input function.

8 Claims, 13 Drawing Sheets

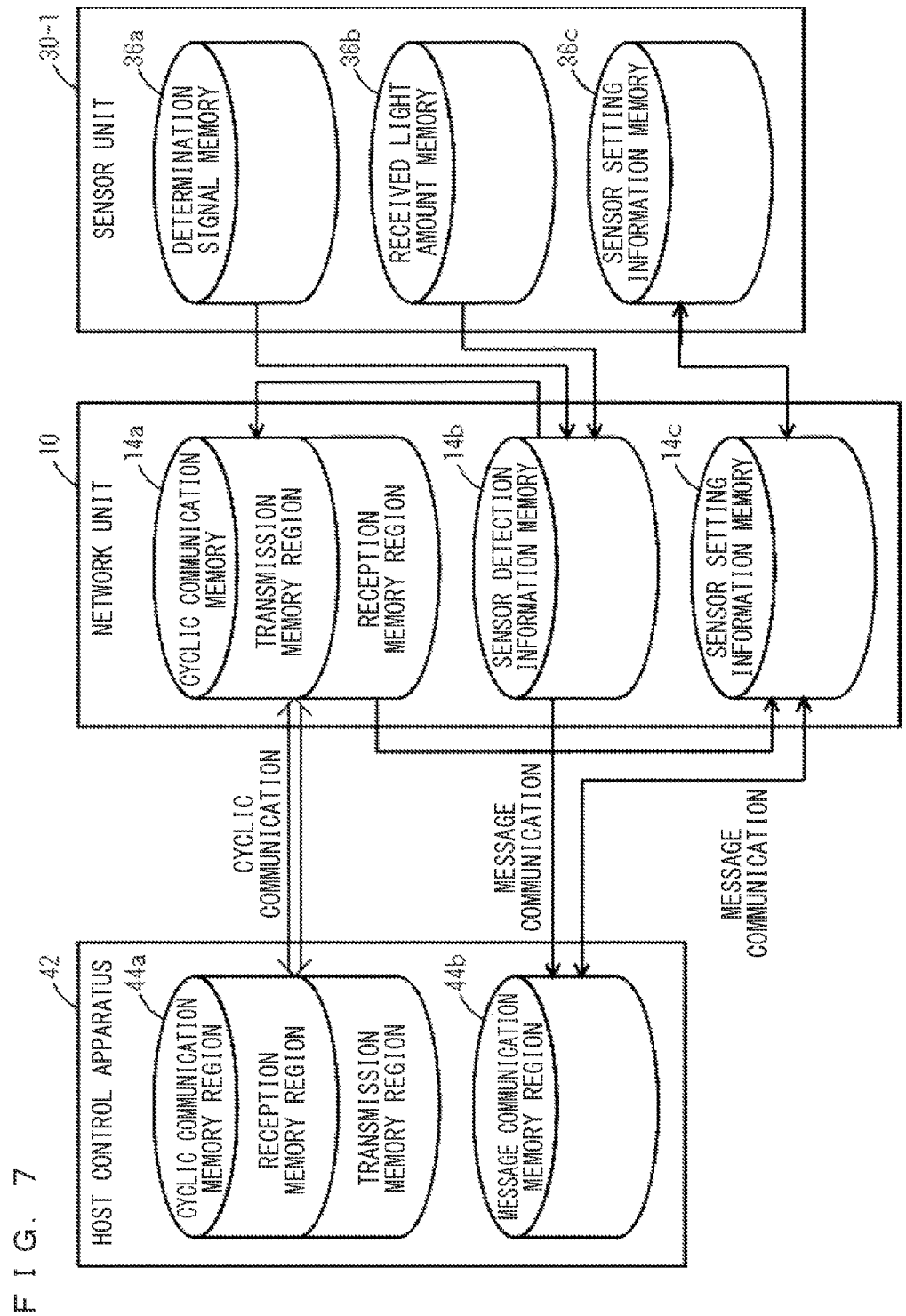
F I G. 7

CONNECTED SENSOR SYSTEM, NETWORK UNIT, AND SENSOR UNIT

CROSS-REFERENCE TO RELATED APPLICATIONS

The present application claims foreign priority based on Japanese Patent Application No. 2009-173755, filed Jul. 24, 2009, the contents of which is incorporated herein by reference.

BACKGROUND OF THE INVENTION

1. Field of the Invention

The present invention relates to a connected sensor system for monitoring a state of an object to be detected, and also relates to a network unit and a sensor unit used for the connected sensor system.

2. Description of the Background Art

In an automated manufacturing line, many sensors for detecting workpieces are arranged in proximity to the workpieces so as to reliably detect the position, the presence/non-presence, the state, and the like of the workpieces.

In this kind of sensor system, it is cumbersome to prepare wirings between many sensors and a control apparatus of the sensors. Therefore, a connected sensor system is utilized, in which these apparatuses are made into units and each unit is connected by physically coupling each unit, so that wirings between the units are completed at a time. In the connected sensor system, many sensor units are connected in proximity to a workpiece, and many sensor heads such as optical fibers connected to each sensor unit are arranged in proximity to a portion of a workpiece to be monitored. In the connected sensor system, a detection signal output from each sensor unit is collected and monitored by a host control apparatus.

Normally, a sensor unit has an external input function to receive and execute various setting signals provided from the outside. Each sensor unit determines the received external input signal. When the external input signal is determined to be a signal pattern of external input, a previously-defined external input function is executed. The external input to each sensor unit is executed by an operation switch arranged on each sensor unit. Alternatively, when the sensor unit has an external input terminal, an external input line connected to this external input terminal is connected to an output terminal of a host control apparatus such as a PLC, and the host control apparatus gives an external input to each sensor unit. A previously-defined external input function is executed, triggered by this external input (for example, Japanese Patent Laid-Open No. 2006-003136).

However, when the user uses the operation switch to perform external input operation, the operation is extremely cumbersome especially in a sensor system including a plurality of connected sensor units. In addition, there is a problem in that an external input cannot be given to all the sensor units at a time or an external input cannot be given at a desired timing. In a case where the external input signal is input via the external input line from the host control apparatus, it is necessary to individually connect each sensor unit and the output terminal of the host control apparatus via a cable, and there is a problem in that the wiring is cumbersome and the connected wires become more complicated.

In contrast, the following configuration has been known. A plurality of sensor units are connected to one network unit, and this network unit is connected to a host control apparatus via a field bus so as to relay communications of the plurality of sensor units. In this configuration, a communication command for accessing an address in the network unit for communicating with each sensor unit may be set by the host control apparatus side, so that the host control apparatus can individually give an external input to each sensor unit via the network unit. According to this configuration, an external input can be given to each sensor unit, without manipulating the operation switch of each sensor unit and without making the wiring complicated.

However, when the host control apparatus gives an external input to each sensor unit via the network unit, it is necessary to design a communication command for each sensor unit. Accordingly, the user needs to understand the specification of the communication command and design a communication command with a ladder program and the like. Therefore, there is a problem in that it is not easy for the user to use it.

The present invention is made in view of the above problems, and it is an object of the present invention to provide a connected sensor system which can be easily used by the user and which can give an external input to each sensor unit without making the wiring complicated, and to provide a network unit and a sensor unit used for the connected sensor system.

SUMMARY OF THE INVENTION

In order to solve the above problems, a connected sensor system includes: a network unit for communicating with a host control apparatus via a field bus; and at least one sensor unit connected to the network unit, the sensor unit obtaining a detection value according to a physical amount detected from an object to be detected, the sensor unit outputting a determination signal upon comparing the detection value with a previously-defined threshold value, the connected sensor system being constituted by coupling the sensor units with each other, wherein the network unit includes: a host communication interface for connecting to the field bus; a cyclic communication memory for storing data for performing cyclic communication for sharing data with the host control apparatus via the host communication interface, the cyclic communication memory including a transmission memory region and a reception memory region including a external input memory region for giving an external input signal to the sensor unit; a sensor communication interface for communicating with each sensor unit coupled with the network unit; and a control unit for executing the cyclic communication with the host control apparatus, as a result of the cyclic communication, the control unit transmitting the external input signal stored in the external input memory region to each sensor unit via the sensor communication interface, and wherein the sensor unit includes: a setting information memory for storing a setting of an external input function executed when the external input signal is received; and a control unit for receiving the external input signal transmitted from the network unit and executing the external input function stored in the setting information memory.

According to the present invention, the external input memory region is allocated in the reception memory region of the cyclic communication memory possessed by the network unit. The user allocates an external input memory region in a writing memory region of the host control apparatus such as a PLC, and the user can easily input the external input signal to each sensor unit only by setting external input data for each sensor unit in this memory region. In a case where a plurality of sensor units are connected to the network unit, the external input signal can be individually input to each sensor unit, or can be input at a time to all the sensor units.

In this case, the connected sensor system may further include a unit for switching, via the sensor communication interface, a partial monitor mode for storing the determination signal to the transmission memory region of the cyclic communication memory and a full monitor mode for storing the detection value of each sensor unit in addition to the determination signal to the transmission memory region of the cyclic communication memory.

As a result, it is possible to switch, as necessary, between a state in which only the determination signal is shared with the host control apparatus through the cyclic communication so as to reduce the communication load and improve the communication speed and a state in which both of the determination signal and the detection values are shared with the host control apparatus through the cyclic communication so as to allow monitoring the determination signal in addition to the detection value of each sensor unit connected to the network. Therefore, the cyclic communication can be executed with the communication load and the response speed suitable for the needs and the purpose of the user.

The connected sensor system may further include a unit for switching whether the external input memory region is allocated in the reception memory region of the cyclic communication memory.

Accordingly, the user can switch whether or not the external input signal is allocated in the cyclic communication memory. Therefore, a user who does not need any external input through the cyclic communication can reduce the communication load and improve the response speed.

In this case, the setting information memory of the sensor unit may store setting information about an output fixing function for fixing an output of the determination signal regardless the comparison result between the detection value and the threshold value as the external input function, wherein the control unit of the sensor unit may execute the output fixing function when the external input signal is received.

Accordingly, the output of each sensor unit can be controlled without relying on the detection value, and virtual detection state can be achieved. In addition, the efficiency in debugging and designing a system in a manufacturing line can be improved.

In this case, the control unit of the sensor unit may fix the output of the determination signal obtained when the external input signal is received.

Accordingly, for example, when a certain abnormality occurs in a manufacturing line in which a plurality of sensor units are installed, the output value of each sensor unit where the abnormality occurred can be maintained in the state where the abnormality occurred. Therefore, the user can efficiently investigate the cause of the abnormality based on the output value of each sensor unit.

In this case, the sensor unit may include an operation unit for selecting the external input function executed when the external input signal is received and a display unit for displaying a setting screen for selecting the external input function, and wherein the control unit of the sensor unit detects that the sensor unit is connected to the network unit and may display the setting screen.

Accordingly, in advance, the user can see the setting screen and manipulate the operation unit to voluntarily set the external input function that is executed when the external input signal is received. In addition, each sensor unit can individually execute a desired external input function when the external input signal is received.

In order to solve the above problems, the present invention provides a network unit used for a connected sensor system, wherein the connected sensor system includes: the network unit for communicating with a host control apparatus via a field bus; and at least one sensor unit connected to the network unit, the sensor unit obtaining a detection value according to a physical amount detected from an object to be detected, the sensor unit outputting a determination signal upon comparing the detection value with a previously-defined threshold value, the connected sensor system being constituted by coupling the sensor units with each other, wherein the network unit includes: a host communication interface for connecting to the field bus; a cyclic communication memory for storing data for performing cyclic communication for sharing data with the host control apparatus via the host communication interface, the cyclic communication memory including a transmission memory region and a reception memory region including a external input memory region for giving an external input signal to the sensor unit; a sensor communication interface for communicating with each sensor unit coupled with the network unit; and a control unit for executing the cyclic communication with the host control apparatus, as a result of the cyclic communication, the control unit transmitting the external input signal stored in the external input memory region to each sensor unit via the sensor communication interface.

In order to solve the above problems, the present invention provides a sensor unit connected to a network unit, wherein the network unit includes: a host communication interface for connecting to a field bus; a cyclic communication memory for storing data for performing cyclic communication for sharing data with a host control apparatus via the host communication interface, the cyclic communication memory including a transmission memory region and a reception memory region including a external input memory region for giving an external input signal to the sensor unit; a sensor communication interface for communicating with each sensor unit coupled with the network unit; and a control unit for executing the cyclic communication with the host control apparatus, as a result of the cyclic communication, the control unit transmitting the external input signal stored in the external input memory region to each sensor unit via the sensor communication interface, wherein the sensor unit obtains a detection value according to a physical amount detected from an object to be detected, the sensor unit outputting a determination signal upon comparing the detection value with a previously-defined threshold value, and wherein the sensor unit includes: a setting information memory for storing a setting of an external input function executed when the external input signal is received; and a control unit for receiving the external input signal transmitted from the network unit and executing the external input function stored in the setting information memory.

The determination signal referred to in the present invention is a binary signal obtained by comparing the signal based on the detection signal of the sensor with a predetermined threshold value. Various kinds of functions may be selected as the operation performed when the sensor unit receives the external input signal, such as a zero-shift function for shifting the detection value to zero, a preset function for adjusting the indication of the amount of light received by a sensor to a predetermined value, and an output fixing function for fixing the determination signal.

The network unit according to the present invention can be connected to a plurality of sensor units (for example, sixteen sensor units), and the cyclic communication memory has the external input memory regions respectively corresponding to the sensor units. Therefore, the external input signal can be input to only some of the sensor units, or the external input signal can be input at a time to all the connected sensor units.

Transparent-type and reflective-type photoelectric sensor units may be considered as examples of sensor units according to the present invention. Preferable examples of photoelectric sensors include a fiber sensor in which an optical fiber is extending from a sensor unit to an object detection region and a separated photoelectric sensor in which a sensor unit is connected via an electric cable to a head including an optical device such as a light emitting device and a light receiving device. The fiber sensor and the separated photoelectric sensor can be used alone without coupling a plurality of fiber sensors and separated photoelectric sensors, and therefore, one sensor unit preferably has one or two sensor heads. Alternatively, other types of sensor units such as a proximity sensor, a pressure sensor, and an ultrasonic wave sensor may be employed as the sensor unit.

In the present invention, both of a connection unit for physical connection and a signal connection unit for signal transmission are included in the host communication interface connecting between the network unit and the field bus, the sensor communication interface connecting between the network unit and a sensor unit, or the connection unit connecting between the sensor units. A connection unit for transmitting a signal by means of an electric connection and a connection unit for transmitting a signal by means of optical transmission/reception may be employed as the signal connection unit for signal transmission.

The present invention provides a connected sensor system which can be easily used by the user and which can give an external input to each sensor unit without making the wiring complicated, and to provide a network unit and a sensor unit used for the connected sensor system.

BRIEF DESCRIPTION OF THE DRAWINGS

FIG. 7 is a view illustrating an entire configuration of a host control apparatus, a network unit, and a memory of each sensor unit according to the present invention;

DESCRIPTION OF THE PREFERRED EMBODIMENTS

Figure 1:
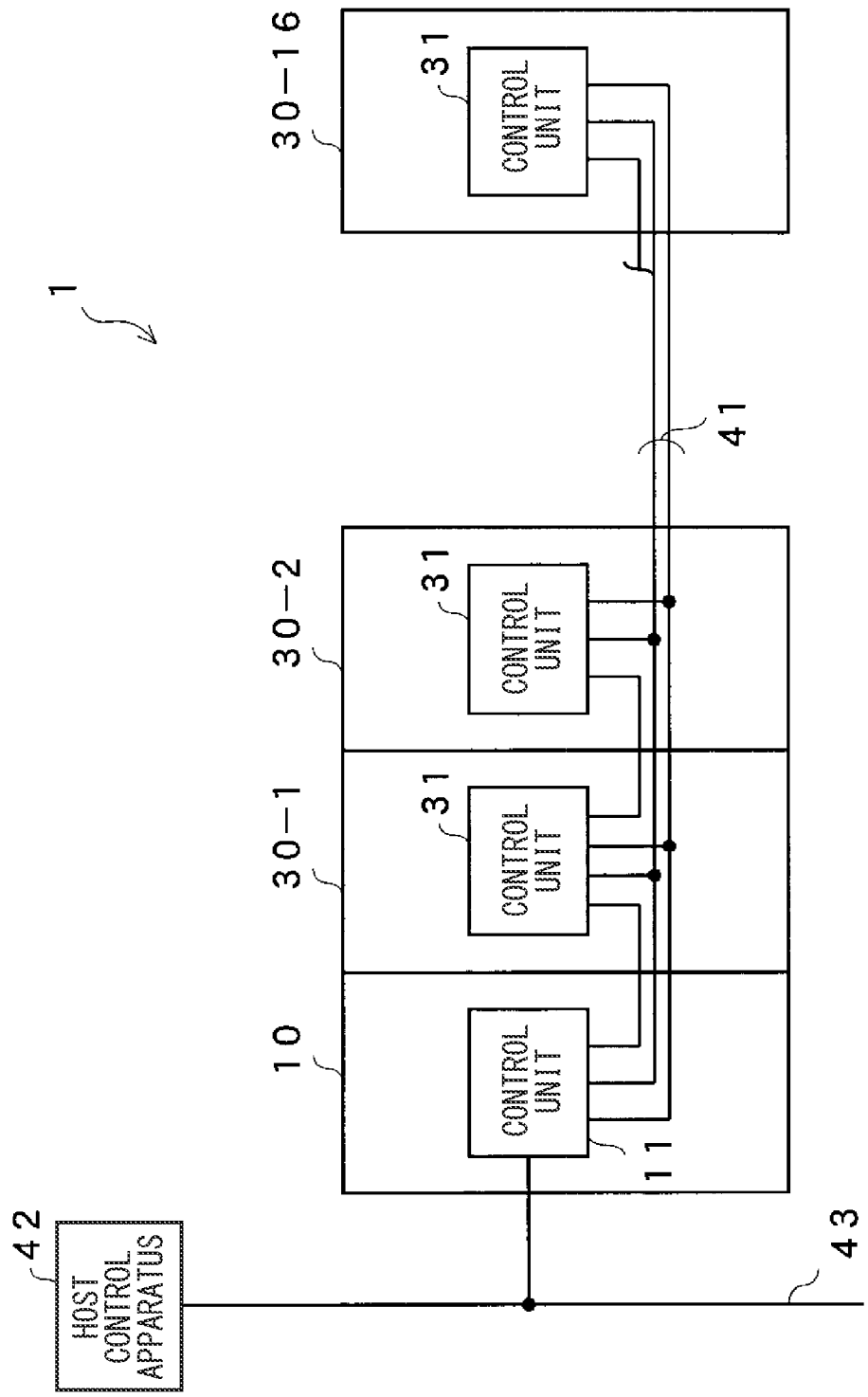
FIG. 1 is an entire configuration diagram illustrating a connected sensor system according to the present invention.

FIG. 1 is a view illustrating an entire configuration of a connected sensor system according to an embodiment of the present invention. The connected sensor system 1 includes at least one sensor unit connected to a network unit 10. In this embodiment, a series of sixteen sensor units 30-1 to 30-16 are connected to the network unit 10. These units are electrically connected via a serial transmission line 41. The serial transmission line 41 is configured to include at least two lines. Hereinafter, a direction toward the network unit 10 is referred to as upstream direction, and a direction toward the sensor unit 30-16 is referred to as downstream direction. The network unit 10 is configured to collect signals transmitted from the sensor units 30-1 to 30-16, and transmit necessary signal to a host control apparatus 42 such as PLC. The network unit 10 is connected to the host control apparatus 42 via a feed bus 43.

Figure 2:
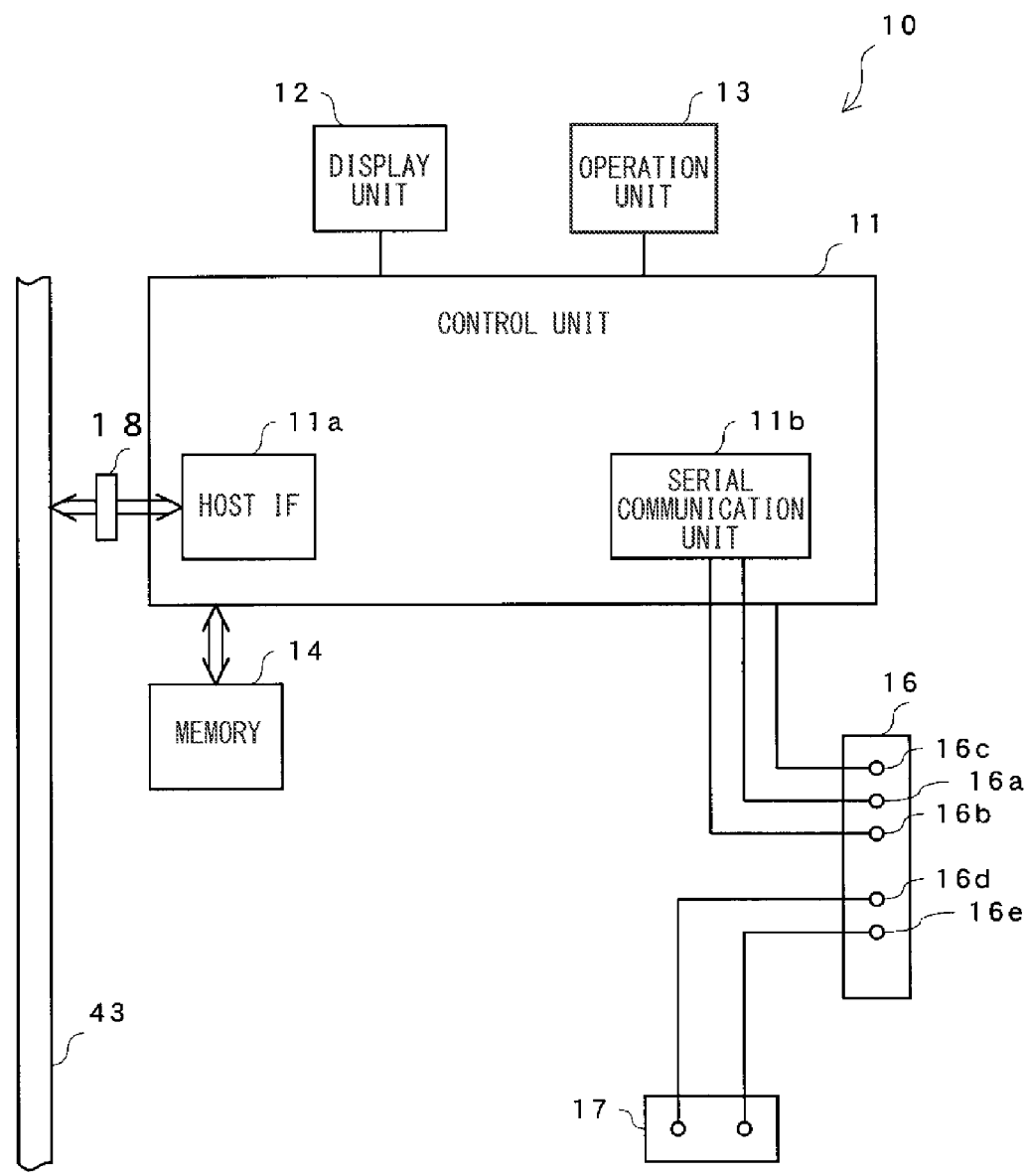
FIG. 2 is a block configuration diagram illustrating a network unit according to the present invention.
Figure 3A:
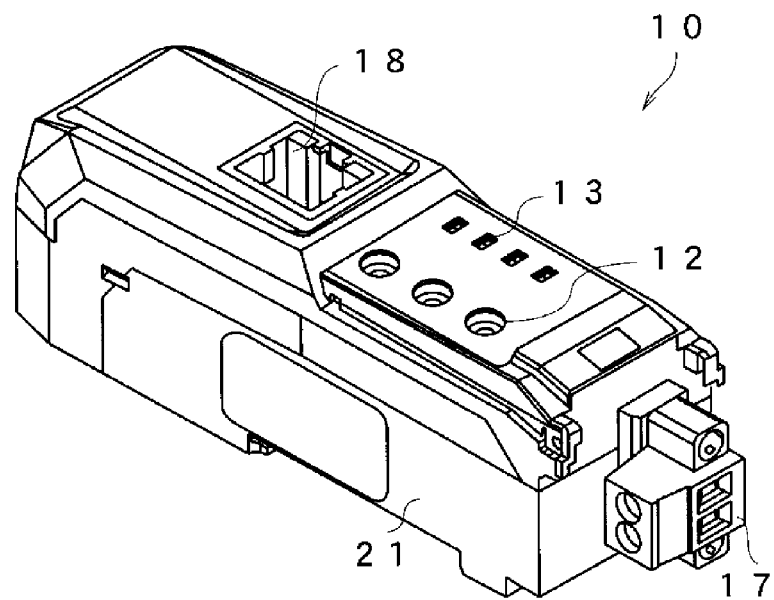
FIGS. 3A and 3B are perspective views illustrating the network unit according to the present invention when the network unit is seen from a side.
Figure 3B:
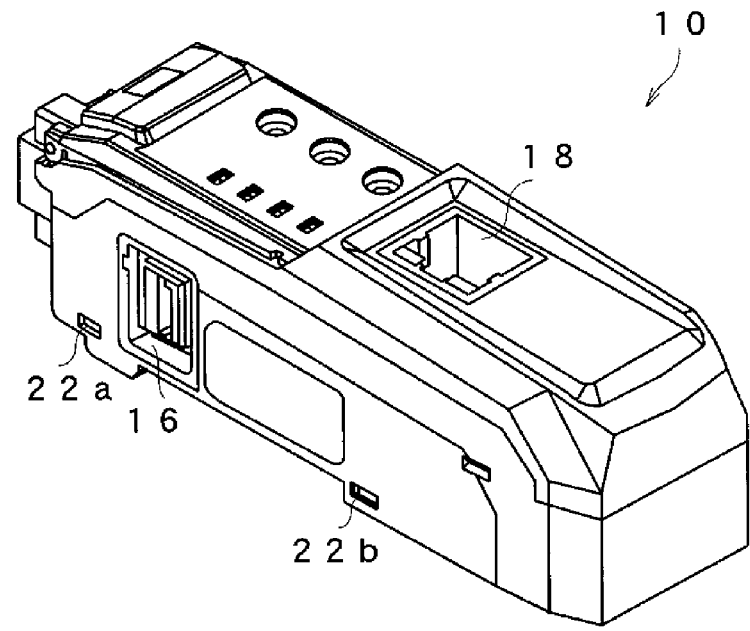

Subsequently, each unit will be explained in detail. FIG. 2 is a block diagram illustrating an internal configuration of the network unit 10. FIG. 3A and FIG. 3B are perspective views illustrating the network unit 10 and depicting the network unit 10 from different angles.

As shown in FIG. 2, the network unit 10 includes a control unit 11. The control unit 11 includes a host interface (IF) 11a serving as a host communication interface and a serial communication unit 11b serving as a sensor communication interface. The control unit 11 of the network unit 10 is connected to a display unit 12, an operation unit 13, a memory 14, and connectors 16, 17 and 18.

The host interface 11a is connected to the field bus 43 via the connector 18, and is adapted to perform a cyclic communication or a message communication with the host control apparatus 42. The control unit 11 is adapted to transmit and receive serial signals to and from the sensor units via the serial transmission line 41, and perform communication via the host interface 11a with the host control apparatus 42.

The serial communication unit 11b is connected to the serial transmission line 41 of the connector 16, and performs serial communication with each sensor unit connected to the connected sensor system. The serial communication unit 11b constitutes the serial transmission line 41.

The connector 16 has five connection terminals, of which connection terminals 16a to 16d are terminals connected to the serial transmission line 41. A terminal 16c is a connection terminal for a timing signal line. Connection terminals 16d and 16e are terminals for power supply, and are connected to the connector 17 for power supply.

The connector 16 of the network unit 10 constitutes a connection unit for electrically connecting to the sensor unit 30-1. The connector 16 transmits and receives the serial signal via the serial transmission line 41, and is adapted to not only transmit a timing signal but also supply power to each sensor unit.

The display unit 12 displays the communication state with the host control apparatus 42, the communication state with each sensor unit, or the abnormality state when a certain abnormality occurs in the network unit 10. The communication state with the host control apparatus 42, the communication state with each sensor unit, or the abnormality state can be distinguished by an illumination pattern or an illuminating color of display lamps such as a plurality of LEDs and the like on the display unit 12. The operation unit 13 is used to set a node address within a field network of the network unit 10, a data size of a later-explained cyclic communication memory, and the operation mode for changing data assign.

The memory 14 stores data for communicating with the host control apparatus 42 and each sensor unit. The details of this memory 14 will be explained later.

The network unit 10 is a unit containing members in a case 21 in a rectangular parallelepiped shape as shown in FIG. 3A and FIG. 3B. The network unit 10 is used by connecting one sensor unit to a sidewall thereof.

As shown in FIG. 3A, the connector 18 is arranged on a top surface of the case 21. The connector 18 is adapted to connect to the host control apparatus 42 such as a programmable controller and a computer. One longitudinal end of the case 21 is arranged with the connector 17 constituted by a screw-type terminal, to which a power supply line, not shown, is connected. An upper surface of the case 21 is arranged with the display unit 12 and operation switches of the operation unit 13.

As shown in FIG. 3B, one sidewall of the case 21 is arranged with the above-described connector 16. The connector 16 has five connection terminals, of which two connection terminals connect to the serial transmission line 41 on downstream side. The remaining connection terminals are used for timing and power supply.

One sidewall of the case 21 is arranged with engaging concave sections 22a and 22b in proximity to both longitudinal ends. Engaging protrusions arranged on the later-described sensor unit 30-1 are inserted into these engaging concave sections 22a and 22b so that the engaging concave sections 22a and 22b engage therewith. The engaging concave sections 22a and 22b constitute a connection unit for positioning and physical connection when the units are coupled with each other.

Figure 4:
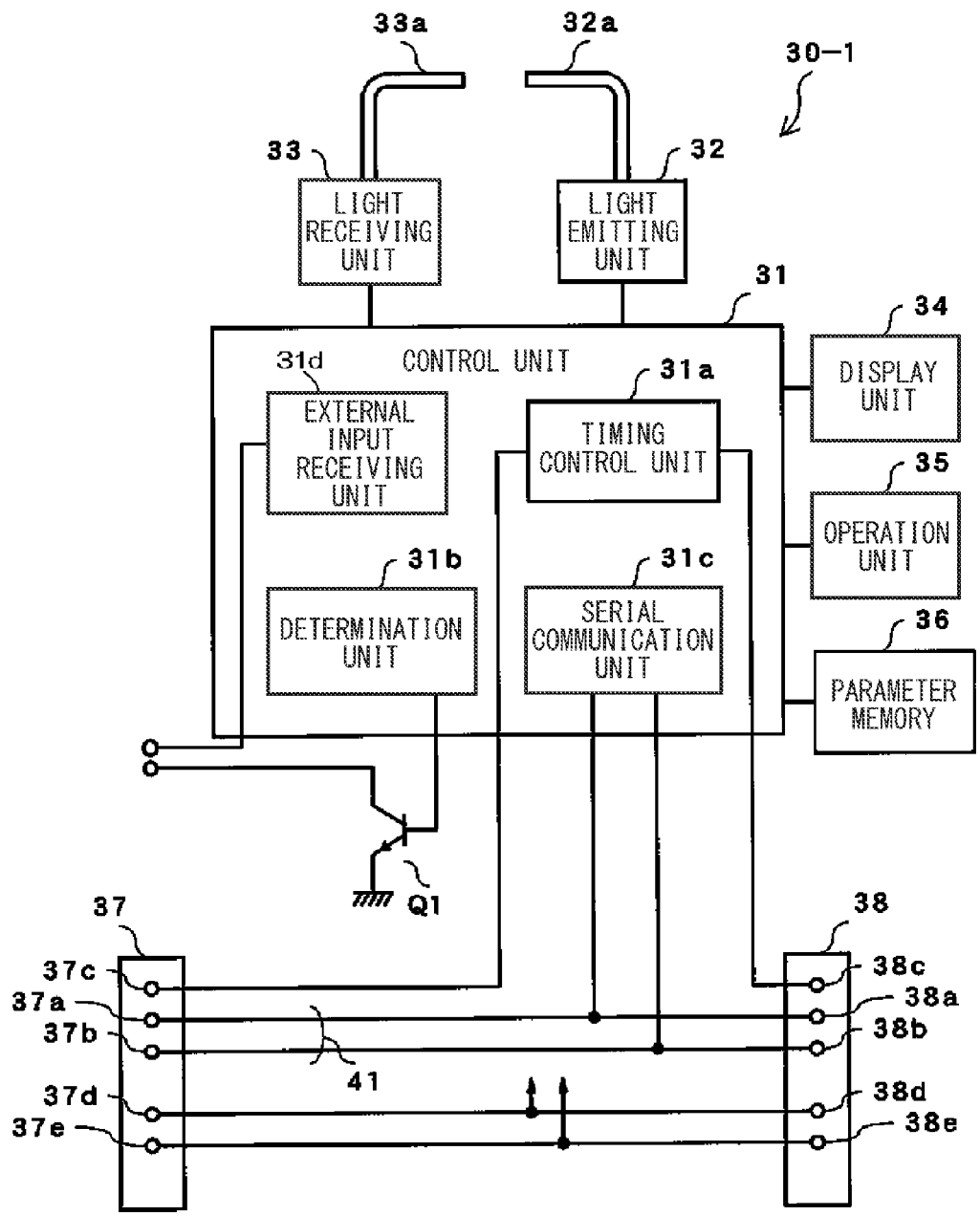
FIG. 4 is a block configuration diagram illustrating a sensor unit according to the present invention.
Figure 5A:
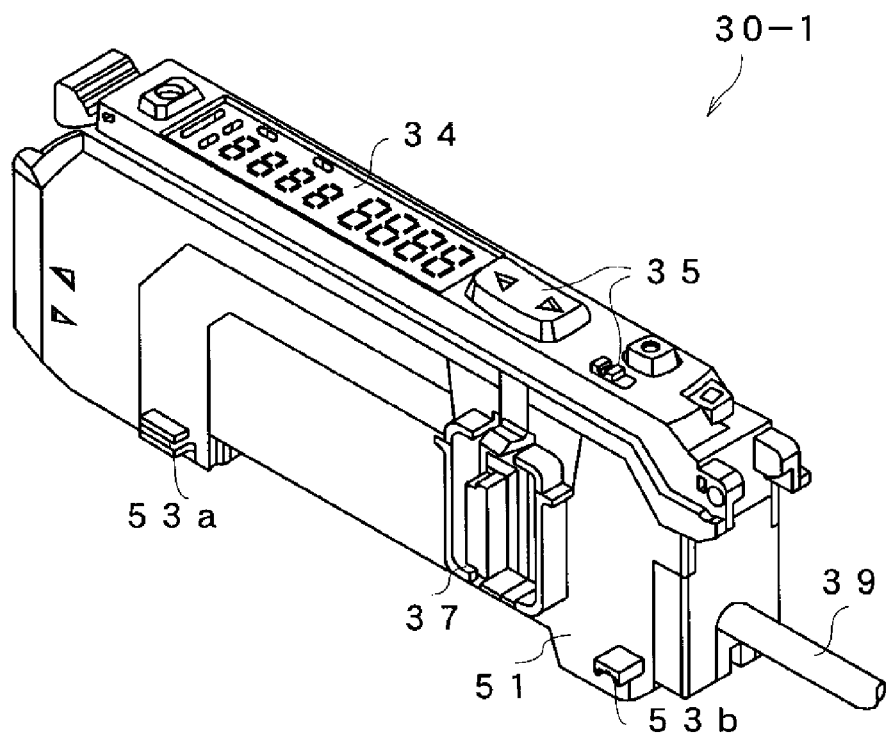
FIGS. 5A and 5B are perspective views illustrating a sensor unit according to the present invention when the sensor unit is seen from a side.
Figure 5B:
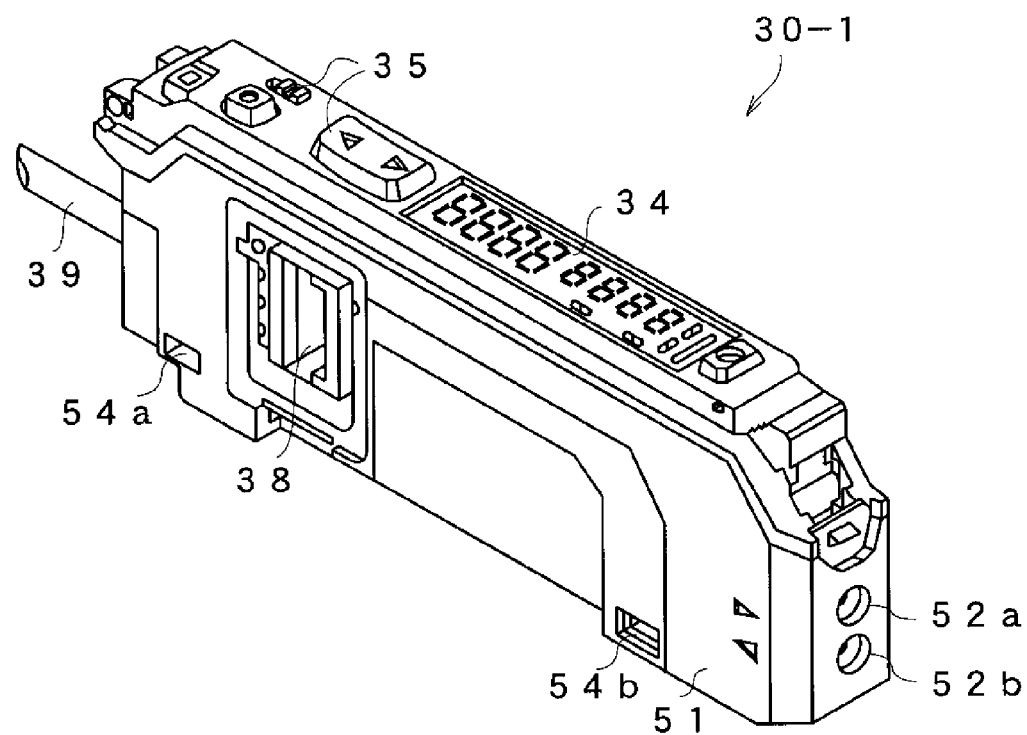

Subsequently, the sensor units are explained. In the present embodiment, the sixteen sensor units 30-1 to 30-16 are coupled, but each sensor unit has the same configuration. Therefore, only the sensor unit 30-1 will be explained with reference to drawings. FIG. 4 is a block diagram illustrating an internal configuration of the sensor unit 30-1. FIG. 5A is a perspective view illustrating the sensor unit 30-1 when the sensor unit 30-1 is seen from one side. FIG. 5B is a perspective view illustrating the sensor unit 30-1 when the sensor unit 30-1 is seen from the other side. In the sensor unit 30-1 according to the present embodiment, the photoelectric sensor has a sensor head made of a pair of optical fibers for emitting light and receiving light. A detection signal is generated in accordance with the amount of light received from the optical fiber for receiving light, and a determination signal is generated by making this detection signal into a binary value using a predetermined threshold value. Then, this determination signal is output.

As shown in FIG. 4, the sensor unit 30-1 has a control unit 31 made with one-chip gate array and microprocessor. A timing control unit 31a, a determination unit 31b, a serial communication unit 31c, and an external input receiving unit 31d are arranged in the control unit 31. The control unit 31 is connected to a light emitting unit 32, a light receiving unit 33, a display unit 34, an operation unit 35, a memory 36, an output transistor Q1, and connectors 37 and 38.

The control unit 31 is adapted to transmit/receive a serial signal to/from the network unit 10 via the serial transmission line 41. When a parameter in the sensor unit 30-1 is updated, the control unit 31 turns on an updated flag held in the memory 36. When the transmission of the parameter is finished, the control unit 31 resets this flag.

The determination unit 31b distinguishes the amount of received light based on a predetermined threshold value to convert the received light into a determination signal indicating binary values either ON or OFF. The determination signal of the sensor is directly output to the outside via the output transistor Q1 and an output line 39.

The serial communication unit 31c is connected to the serial transmission line 41 of the connectors 37 and 38, and performs serial communication with the network unit 10 connected to the connected sensor system. Therefore, the serial communication unit 31c constitutes a serial transmission unit. The external input receiving unit 31d directly receives an external input without using the network unit 10. The external input line is included in the output line 39.

The light emitting unit 32 drives a light emitting device based on the timing signal transmitted from the timing control unit 31a. The light emitted by the light emitting device is transmitted via an optical fiber 32a, and the light is emitted from the tip of the optical fiber 32a. The light emitted by the optical fiber 32a enters into an optical fiber 33a via an object detection area, and is directed to the light receiving unit 33. The light receiving unit 33 converts the incident light into an electric signal, and amplifies the electric signal.

The memory 36 includes a volatile memory storing the detected detection value and the determination signal and a non-volatile memory storing various kinds of setting information such as a threshold value individually set in each sensor unit. The above data stored in the memory are transferred to the network unit 10 via the serial transmission line 41.

The connector 37 can be connected to the connector 16 of the network unit 10 and a connector 38 of an adjacent sensor unit. Two connection terminals 37a, 37b of the connector 37 connected to the upstream side of the serial transmission line 41 are directly connected to connection terminals 38a, 38b, respectively, of the connector 38. Thus, the serial transmission line 41 is formed.

The connector 38 has two connection terminals 38a, 38b connected to the downstream side of the serial transmission line 41. The connection terminals 37a, 37b of the connector 37 are directly connected to connection terminals 38a, 38b, respectively, of the connector 38. Thus, the serial transmission line 41 is formed.

A connection terminal 37c of the connector 37 is connected to a connection terminal 38c of the connector 38 via the timing control unit 31a. Connection terminals 37d, 37e of the connector 37 are directly connected to connection terminals 38d, 38e, respectively, of the connector 38. Accordingly, a power is supplied to the inside of the sensor unit 30-1, and to sensor units of downstream.

As shown in FIG. 5A and FIG. 5B, the sensor unit 30-1 is a unit containing members in a narrow case 51. An upper surface of the case 51 is arranged with a display unit 34 made with a four-digit seven-segment LED display device and an operation unit 35 made with various kinds of switches. The display unit 34 can digitally display the amount of receiving light and setting threshold values of the sensor and values such as the amount of receiving light, and margins.

The upper section of the case 51 is arranged with a detachable cover for covering the entire upper surface, but this cover is omitted from FIG. 5. The longitudinal end of the case 51 is arranged with head attachment holes 52a and 52b for attaching the optical fibers 32a and 33a and a fixing lever for fixing the optical fibers 32a and 33a.

As shown in FIG. 5A, one sidewall of the case 51 is arranged with the connector 37. The one sidewall of the case 51 is also arranged with engaging protrusions 53a and 53b in proximity to both longitudinal ends. These engaging protrusions 53a and 53b are inserted into the engaging concave sections 22a and 22b of the network 10 to engage therewith. The engaging protrusions 53a and 53b constitute a connection unit for positioning and physical connection when the network unit is coupled. The connector 37 constitutes a connection unit for electrically connecting to a network unit 10 or sensor unit of upstream side.

As shown in FIG. 5B, the other sidewall of the case 51 is arranged with the connector 38 at a position symmetrical to the connector 37. The other sidewall of the case 51 is arranged with engaging concave sections 54a and 54b in proximity to both longitudinal ends. The engaging protrusions arranged on a sensor unit of downstream side are inserted into engaging concave sections 54a and 54b to engage therewith. The engaging concave sections 54a and 54b constitute a connection unit for positioning and physical connection when the sensor units, are coupled with each other. The connector 38 constitutes a connection unit for electrically connecting to a sensor unit of upstream side.

Figure 6:
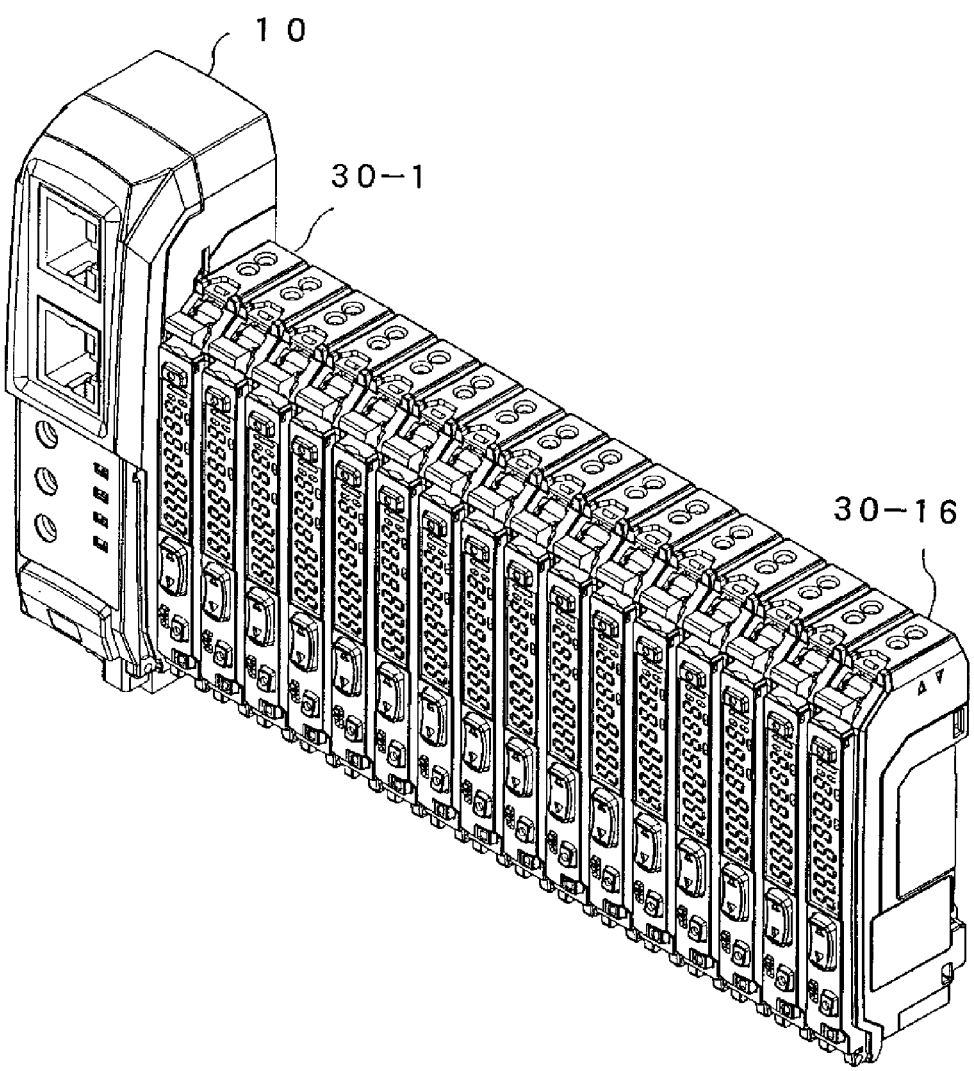
FIG. 6 is a view illustrating an entire configuration of the connected sensor system according to the present invention.

Subsequently, a configuration of a connected sensor system 1 and its operation will be described. The connected sensor system 1 is made as a combination of the network unit and the sensor units. The connected sensor system 1 according to the present embodiment can be made into various forms by combining the network unit 10 and at least one sensor unit. But, in the present embodiment, it is assumed that one network unit 10 and sixteen sensor units 30-1 to 30-16 are coupled and connected with each other as shown in FIG. 1 and FIG. 6. When the network unit 10 and the sensor unit 30-1 are coupled, the connectors 16 and 37 are connected with each other. Further, the connector 38 of each sensor unit is connected to the connector 37 of an adjacent sensor unit.

In the connected sensor system 1 according to the present embodiment, the connector 18 of the network unit 10 is connected to the host control apparatus 42 via a cable, and the connector 17 is connected to a direct current power supply. In each sensor unit, an optical fiber, not shown, is extended to a monitoring position of a workpiece.

In the connected sensor system 1 thus configured, the monitoring of workpieces is controlled as follows. When the control unit 11 of the network unit 10 transmits a timing signal to the adjacent sensor unit 30-1, the timing control unit 31a of the sensor unit 30-1 receives the timing signal. When the timing control unit 31a of the sensor unit 30-1 receives the timing signal, the control unit 31 causes the light emitting unit 32 to emit light, so that the light receiving unit 33 obtains a light reception signal of a different level according to whether there is a workpiece or not. The light reception signal is converted into a binary determination signal using a threshold value set by the determination unit 31b, and the sensor unit 30-1 outputs the determination signal to the outside through the output transistor Q1 and the output line 39. This determination signal and the amount of received light are stored until a subsequent timing signal is obtained.

After a predetermined time (for example, 10 microseconds) passes since the timing signal is received, the timing control unit 31a transmits the timing signal to the adjacent sensor unit by way of the terminal 38c. As described above, the timing signal delayed by each sensor unit by a predetermined time is relayed to each sensor unit of downstream side in a bucket brigade manner. Accordingly, a time of light emission is delayed by the predetermined time in each sensor unit, so that a sensor unit of downstream side has a larger delay time of light emission than a sensor unit of upstream side. Therefore, an interference between photoelectric sensors can be prevented.

In the present embodiment, signal transmission between the network unit 10 and each sensor unit and between each sensor unit is performed by bus connection via the serial transmission line 41 serving as the connection unit, for example. Alternatively, a pair of connectors arranged with the same number of connection terminals may be formed on each sensor unit, and parallel transmission may be employed. Further, the signal transmission is not limited to electrical connection. Any connection unit for transmitting a signal by transmitting and receiving light may be employed. In this case, a signal may be transmitted by optical communication between a network unit and an adjacent sensor unit and between sensor units, and a bucket brigade style signal transmission form can be employed to transmit the signal to each downstream sensor unit.

FIG. 7 is a structure diagram of memories in the host control apparatus 42, the network unit 10, and the sensor unit 30-1. The memory 14 of the network unit 10 includes a cyclic communication memory 14a, a sensor detection information memory 14b, and a sensor setting information memory 14c. The network unit 10 executes cyclic communication using data stored in the host control apparatus 42 and the cyclic communication memory 14a. In the cyclic communication, memory regions for cyclic communication are arranged in both of the host control apparatus 42 and the network unit 10, and data are mutually transmitted and received with a predetermined cyclic cycle, so that data stored in a cyclic communication memory region are shared.

First, the user allocates a cyclic communication memory region 44a in the memory region of the host control apparatus 42. The cyclic communication memory region 44a corresponds to the cyclic communication memory 14a of the network unit 10. Subsequently, data are stored to a transmission memory region of the cyclic communication memory region 44a. In the cyclic communication, the stored data are transferred to a reception memory region of the cyclic communication memory 14a on the network unit side at a predetermined cycle. On the contrary, data stored in a transmission memory region of the cyclic communication memory 14a of the network unit 10 are transferred to a reception memory region of the cyclic communication memory region 44a of the host control apparatus 42 at a predetermined cycle.

Therefore, by making use of the cyclic communication memories arranged on both of the host control apparatus 42 and the network unit 10, the user can easily write data from the host control apparatus 42 to the network unit 10 and read data from the network unit to the host control apparatus 42, in which it is not necessary to control communication commands at all.

The sensor detection information memory 14b of the network unit 10 individually has as many memory regions as the number of sensor units connected to the network 10, and individually stores the amount of received light detected by each sensor unit and the determination signal generated by comparing the amount of received light with the threshold value individually set for each sensor unit. Detection information of each sensor unit stored in the sensor detection information memory 14b is transferred to the cyclic communication memory 14a, and subsequently, the detection information is stored to the reception memory region of the cyclic communication memory region 44a of the host control apparatus 42 as a result of the cyclic communication between the host control apparatus 42 and the network unit 10. As described above, the host control apparatus 42 can obtain and manage the detection information of each sensor unit connected to the network unit 10.

The sensor setting information memory 14c of the network unit 10 is a memory storing setting information of each sensor unit connected to the network unit 10. The setting information referred to herein includes, for example, a power mode for controlling the amount of light received by each sensor unit, a threshold value compared with a detection value, later-explained external input function setting information, and the like. By performing a message communication, the host control apparatus 42 can read and write the various kinds of setting information stored in the sensor setting information memory 14c.

In general, in the cyclic communication, the cyclic communication memory data of each node existing in the field network are shared by all the nodes. As a result, when the cyclic communication memory has a data size larger than necessary, the communication load increases, which deteriorates the response of each sensor unit. Therefore, the user sets a communication command in a message communication memory region 44b of the host control apparatus 42 as necessary, and accordingly the user can read and write setting information which is not so much needed to be monitored by the host control apparatus 42. This will be explained in detail later.

The memory 36 of each sensor unit includes a determination signal memory 36a, a received light amount memory 36b, and a sensor setting information memory 36c. When the control unit 31 receives the timing control signal, each sensor unit controls the light emitting unit 32 and the light receiving unit 33 so as to obtain the latest amount of received light. Then, each sensor unit stores the amount of received light to the received light amount memory 36b, and obtains a determination signal by comparing the amount of received light thus obtained with a threshold value stored in the sensor setting information memory 36C. Thereupon, each sensor unit stores the latest determination signal to the determination signal memory 36a.

The network unit 10 and each sensor unit execute the cyclic communication via the serial transmission line 41. The obtained latest amount of received light and the determination signal are transferred to the sensor detection information memory 14b of the network unit 10, and are stored in the memory region allocated for the corresponding sensor unit.

The sensor setting information memory 36c stores setting information set for each sensor unit. The network unit 10 collects and stores the setting information stored in the sensor setting information memory 36c of each sensor unit connected at the time when the system is activated. Thereafter, the setting information of only the sensor unit in which a setting information update flag is turned on is transferred to the sensor setting information memory 14c of the network unit 10. When the setting information update flag is turned on, it means that the user has manipulated the operation unit 35 of the sensor unit and changed the setting information. Accordingly, when the setting information is not changed, only the determination signal and the amount of received light are cyclicly transferred to the network unit 10. Therefore, the setting information of each sensor unit is managed with the minimum increase of traffic.

In the present embodiment, the determination signal of each sensor unit is transferred via the serial transmission line 41, and is stored to the sensor detection information memory 14b of the network unit 10. Alternatively, an output line may be arranged in each sensor unit to directly output a determination signal, and the determination signal of each sensor unit may be output via the output signal, so that the determination signal may be directly transferred to the cyclic communication memory 14a and stored therein.

Figure 8:
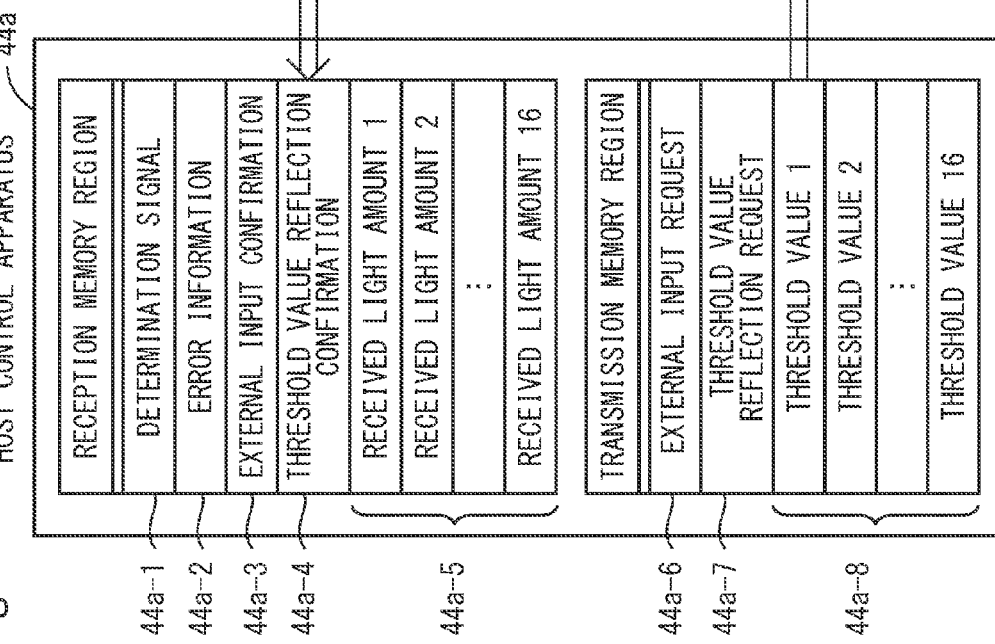
FIG. 8 is a view illustrating an example (full monitor mode) of a data structure of a cyclic communication memory of the network unit and the host control apparatus according to the present invention.

FIG. 8 is a view illustrating a data structure of the cyclic communication memory of the network unit 10 and the host control apparatus 42. The cyclic communication memory 14a of the network unit 10 is divided into the transmission memory region and the reception memory region. The transmission memory region includes a determination signal region 14a-1 storing a determination signal obtained from each sensor unit, an error information region 14a-2 storing error information of each sensor unit, an external input confirmation region 14a-3, a threshold value reflection confirmation region 14a-4, and a received light amount region 14a-5. The reception memory region includes an external input request region 14a-6, a threshold value reflection request region 14a-7, and a threshold value region 14a-8. The control unit 11 allocates the memory region for as many received light amount regions 14a-5 and threshold value regions 14a-8 as the number of connected sensor units as necessary. It should be noted that the data structure explained above is merely an example, and the data structure is not limited thereto.

As shown in FIG. 8, in the cyclic communication memory region 44a of the host control apparatus 42, the user allocates a memory region corresponding to the data structure of the cyclic communication memory 14a of the network unit 10. Then, for example, when the user wants to change the threshold value of the second sensor unit 30-2 connected to the network unit 10, the user sets 1 to a bit corresponding to the sensor unit 30-2 of a threshold value reflection request region 44a-7 of the host control apparatus 42, and stores the desired threshold value to a threshold value region 2 of a threshold value region 44a-8. The above stored data are transferred by the cyclic communication to the threshold value reflection request region 14a-7 and the threshold value region 14a-8 of the network unit 10 and are stored therein.

The network unit 10 transfers the threshold value stored in the threshold value region 2 of the threshold value region 14a-8 to the storage region of the sensor unit 30-2 of the sensor setting information memory 36c, and stores the threshold value therein, thus transferring the desired threshold value to the sensor unit 30-2. When the sensor unit 30-2 receives the threshold value, the sensor unit 30-2 stores the threshold value to the sensor setting information memory 36c, and replies a response indicating that the threshold value has been reflected in the network unit 10. When the network unit 10 receives the response, the network unit 10 sets one to the bit corresponding to the sensor unit 30-2 of the threshold value reflection confirmation region 14a-4 of the transmission memory region of the cyclic communication memory 14a. As described above, the host control apparatus 42 can confirm that the threshold value of the sensor unit 30-2 has been reflected.

On the other hand, the determination signal region 14a-1 and the received light amount region 14a-5 of the cyclic communication memory 14a of the network unit 10 store the latest determination signal and the latest amount of received light of each of the sensor units 30-1 to 30-16 connected to the network unit 10. Therefore, the user can obtain the determination signal and the amount of received light of each sensor unit by using host control apparatus 42, and can individually manage the state of each sensor unit. For example, a warning signal is emitted when the amount of light received by a certain sensor unit becomes equal to or less than a predetermined amount of received light.

The cyclic communication memory 14a of the network unit 10 includes the external input request region 14a-6 in addition to the determination signal region 14a-1 and the threshold value region 14a-8. Hereinafter explained are the processings and operation in a case where the user executes an external input to the sensor unit 30-1 and executes a previously defined external input function.

First, the user executes a function executed by the sensor unit 30-1 when the sensor unit 30-1 receives an external input from the host control apparatus 42 (hereinafter referred to as external input function). This setting is executed by manipulating the operation unit arranged on each sensor unit 30-1 or by causing the host control apparatus 42 to transmit a setting command to the sensor unit 30-1 through a message communication. The setting information is stored in the sensor setting information memory 14c of each sensor unit.

Figure 9:
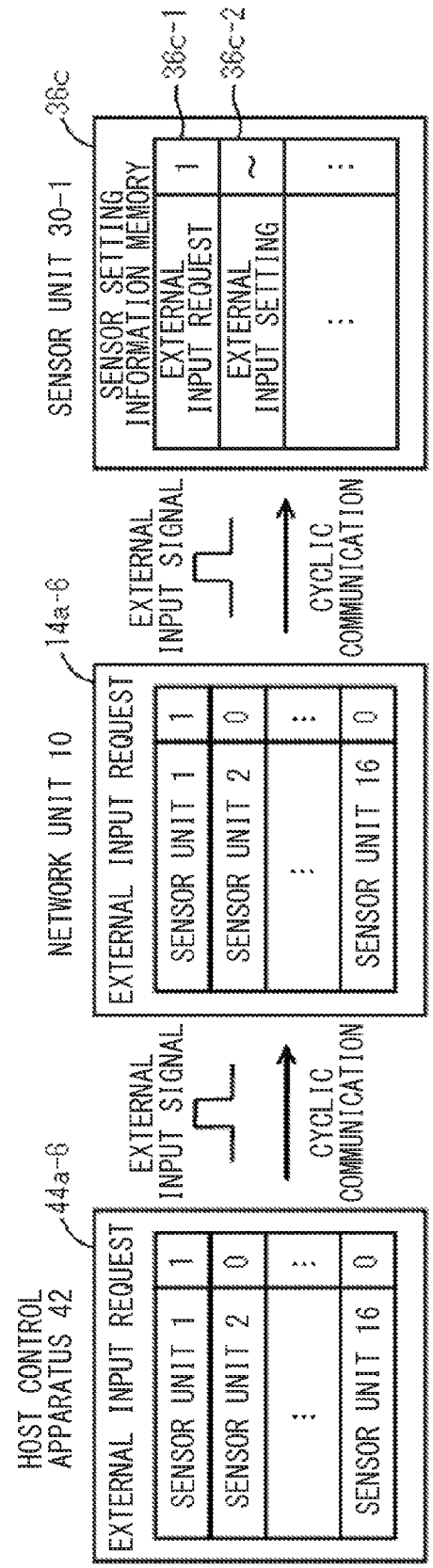
FIG. 9 is a view illustrating a flow of an external input request from the host control apparatus to the sensor unit according to the present invention.

Subsequently, the user inputs data to a bit corresponding to the sensor unit 30-1 of an external input request region 44a-6 of a cyclic communication memory region 44a of the host control apparatus 42 (see FIG. 9). Subsequently, an external input signal is given to the network unit 10 by the cyclic communication, and the data is automatically input to the bit, corresponding to the sensor unit 1, in the external input request region 14a-6 of the cyclic communication memory 14a.

The network unit 10 transmits an external input signal to the sensor unit 30-1 based on the data stored in the cyclic communication memory 14a. The control unit 31 of the sensor unit 30-1 receives the external input signal, and inputs the data to an external input request memory 36c-1 of the sensor setting information memory 36c. The control unit 31 executes an external input function previously stored in an external input setting 36c-2, and transmits to the network unit 10 a response indicating that the external input signal has been received. The network unit 10 receives the response, and inputs the data to a bit corresponding to the sensor unit 30-1 of the external input confirmation region 14a-3 in a transmission memory region of the cyclic communication 14a. Therefore, the user can confirm whether the external input has been completed by checking an external input confirmation region 44a-3 of the host control apparatus 42.

As described above, the external input function executed by each sensor unit upon receiving the external input signal is defined by manipulating the operation unit 35 arranged on each sensor unit or performing a message communication by way of the host control apparatus 42. However, when the data region for inputting the external input signal from the outside is allocated in the cyclic communication memory 14a of the network unit 10, the external input signal serving as a trigger for executing the defined operation can be individually input to each sensor unit only by storing the external input signal to the cyclic communication memory region 44a of the host control apparatus 42. As a result, it is not at all necessary for the user to define a command for a message communication for external input, and the user can input the external input signal to each sensor unit according to the same procedure as the procedure in a case where the host control apparatus and each sensor unit are individually wired by external input lines.

When a plurality of sensor units are connected to the network unit 10, an external input function previously defined in each sensor unit is separately defined in each sensor unit. Accordingly, each sensor unit can execute a different operation when an external input signal is received. On the other hand, when the same operation is defined in each sensor unit, the user can cause all the sensor units to execute the same operation at a time by inputting an external input signal at the time.

Meanwhile, as described above, a large data size of the cyclic communication memory results in a larger communication load. Therefore, the cyclic communication memory preferably has the minimum data size.

Figure 10:
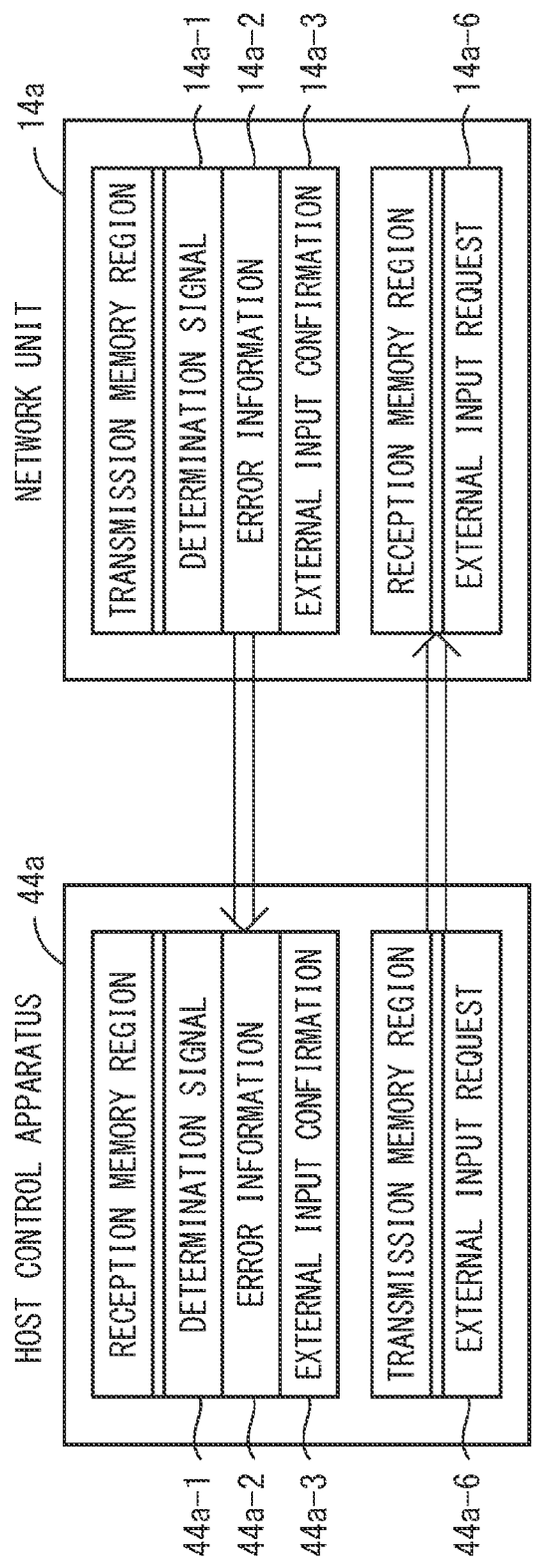
FIG. 10 is a view illustrating an example (partial monitor mode) of a data structure of the cyclic communication memory of the network unit and the host control apparatus according to the present invention.

FIG. 10 is a view illustrating an example (partial monitor mode) of another data structure of the cyclic communication memory 14a of the network unit 10. In this example, the received light amount region 14a-5 and the threshold value region 14a-8 are not allocated in contrast to the example of FIG. 8 (full monitor mode). Accordingly, in this example, only the determination signal of each sensor unit can be monitored by the host control apparatus 42, and the threshold value of each sensor unit cannot be changed by the host control apparatus 42. In this partial monitor mode, the amount of data cyclically communicated with the host control apparatus 42 is less than the amount of data communicated in the full monitor mode, and therefore, the communication load can be reduced.

Figure 11:
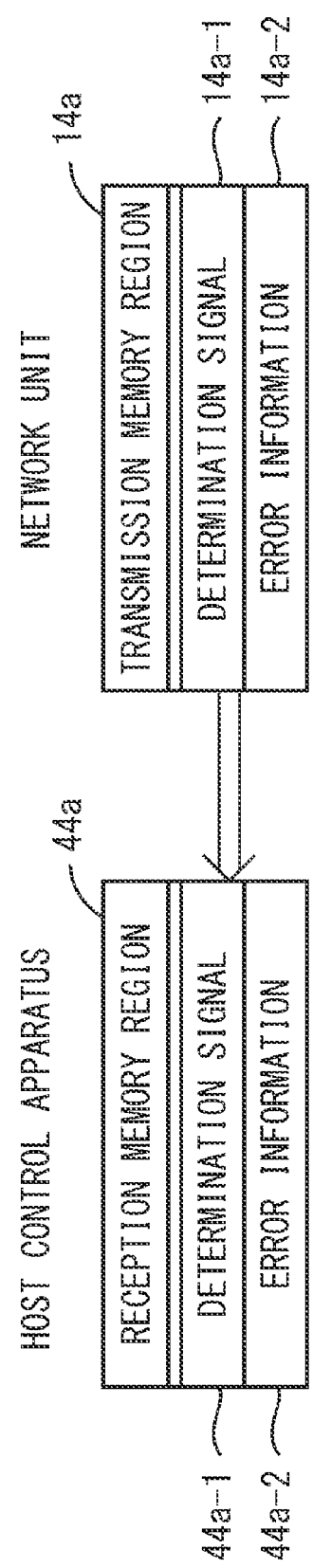
FIG. 11 is a view illustrating an example (fast monitor mode) of a data structure of the cyclic communication memory of the network unit and the host control apparatus according to the present invention.

Depending on the purpose of the user, it may be not necessary to give an external input to the network unit 10 in the host control apparatus 42. FIG. 11 is a view illustrating an example (fast monitor mode) of a still another data structure of the cyclic communication memory 14a of the network unit 10. In this example, no memory region for reception is allocated, only the determination signal region 14a-1 and the error information region 14a-2 for each sensor unit are allocated as the memory region for transmission. In this example, the amount of data cyclically communicated with the host control apparatus 42 is less than the amount of data communicated in the above partial monitor mode, and therefore, the burden placed on the communication traffic can be further reduced.

In the present embodiment, the user can switch these operation modes (the partial monitor mode, the full monitor mode, and the fast monitor mode) according to the purpose and the needs of the user by manipulating the operation unit 13 of the network unit 10 (for example, a DIP switch). When the control unit 11 of the network unit 10 detects the switching of the operation mode performed by the user, the control unit 11 changes the memory size and the data allocation of the cyclic communication memory 14a. It should be noted that when the operation mode is changed, it is necessary to reconfigure the cyclic communication memory region of the host control apparatus 42 side according to the content of the change.

Since the operation mode can be switched, the data size and the data type of the cyclic communication can be selected according to the purpose of the user. For example, a user who prefers fast communication may select the fast monitor mode. A user who wants to use the external input function may select the partial monitor mode. A user who wants to use not only the external input function but also wants to monitor the amount of light received by each sensor unit and set the threshold values may select the full monitor mode.

Figure 12:
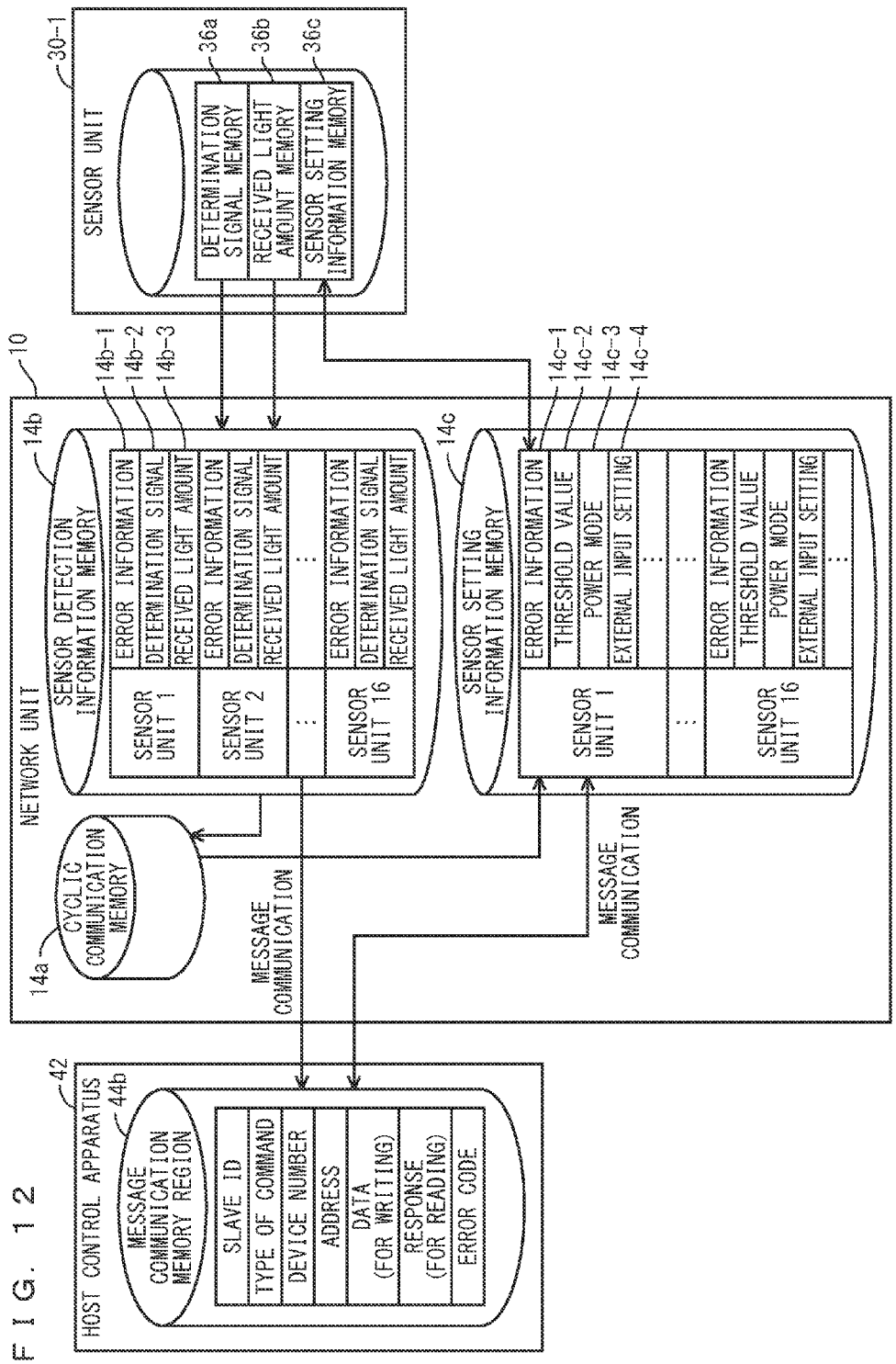
FIG. 12 is a view illustrating an example of a memory data structure illustrating a message communication between the network unit and the host control apparatus according to the present invention.

Subsequently, the message communication between the host control apparatus 42 and the network unit 10 will be explained in detail. As described above, when information about all the sensor units collected by the network unit 10 is allocated in the cyclic communication memory 14a and transferred to the host control apparatus 42, a heavy load is placed on the communication traffic. FIG. 12 is a view illustrating a message communication between the network unit 10 and the host control apparatus 42. The sensor detection information memory 14b of the network unit 10 has an individual memory region for each connected sensor unit, collects the error information, the determination signal, and the amount of received light from each sensor unit, and respectively stores the error information, the determination signal, and the amount of received light to an error information region 14b-1, a determination signal region 14b-2, and a received light amount region 14b-3. The above storage data are given to the cyclic communication memory 14a, and can be read by the host control apparatus 42 through the message communication.

The sensor setting information memory 14c of the network unit 10 collects the setting information from each sensor unit. When an update request of data is received from the outside, a change request of setting information is given to each sensor unit. The sensor setting information memory 14c also has an individual memory region for each connected sensor unit, and each memory region includes, for example, an error information region 14c-1, a threshold value region 14c-2, a power mode region 14c-3, an external input setting region 14c-4, and the like. However, the memory region is not limited thereto.

The data stored in the sensor setting information memory 14c can be read and written by the host control apparatus 42 through the message communication. In the message communication memory region 44b of the host control apparatus 42, it is necessary to set a slave ID for distinguishing the network unit 10, a device number of a sensor unit, and an address for reading and writing. When data is to be written, it is necessary to set the data to be written. When reading operation is to be performed, it is necessary to set a memory region for response.

As described above, in the message communication, it is necessary to design a command by specifically specifying an address for reading and writing. Accordingly, there is a problem in that it is not easy for the user to use the message communication. On the other hand, since the message communication is not performed in a cyclic manner, there is an advantage in that the communication load is small. Therefore, the information stored in the sensor setting information memory which is less needed to be always monitored can be read and written by the user through the message communication as necessary. The detection information highly needed to be monitored, such as the determination signal of the sensor unit, is allocated in the cyclic communication memory 14a, so that the detection information can be always monitored in which it is not necessary to set any communication command.

Hereinafter, the external input function executed by each sensor unit upon receiving the external input will be explained. Various kinds of functions may be selected as the external input function, such as a zero-shift function for shifting a detection value to zero, a preset function for adjusting the indication of the amount of light received by a sensor to a predetermined value, a light-emission OFF function for turning OFF the light emission function, a display OFF function for turning OFF the display LED, and an output fixing function for fixing the determination signal. The external input function is selected by manipulating the operation unit 35 of each sensor unit while checking the display unit 34.

In the present embodiment, a sensor unit has the external input receiving unit 31d for directly receiving the external input. Since the sensor unit can receive the external input signal via the network unit 10 as explained above, the external input signal can be input to each sensor without the external input receiving unit 31d. In this case, the control unit 31 of each sensor unit may display a setting screen for selecting the external input function, only when the control unit 31 detects the network unit 10 being connected. That is, the setting screen of the external input function is displayed, only when the external input signal is ready to be received. Accordingly, this prevents manipulation of the setting screen that is not needed by a user who uses a sensor unit alone without connecting the network unit 10 to the sensor unit. Therefore, the convenience of the user can be enhanced.

Figure 13:
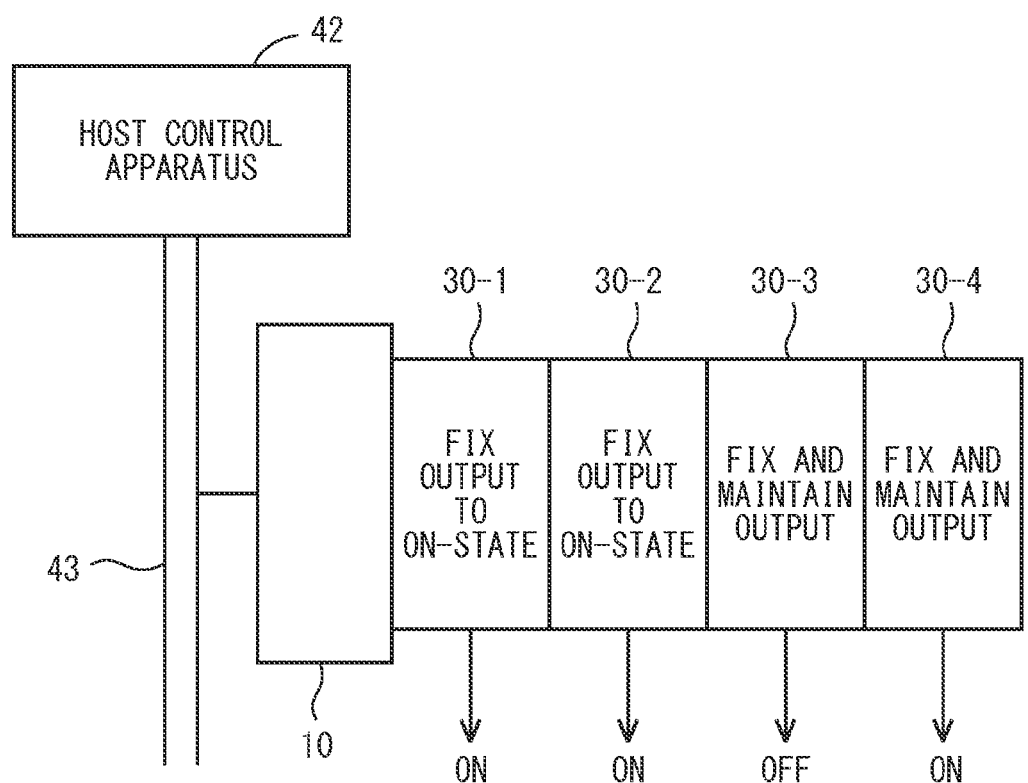
FIG. 13 is view illustrating an output fixing function of sensor units according to the present invention.

FIG. 13 is view illustrating an example of operation of an external input function when a plurality of sensor units are connected to the network unit 10. In the example of FIG. 13, the sensor units 30-1, 30-2 have the output fixing function for always turning on the output of the determination signal as the external input function, and the sensor units 30-3, 30-4 have the output fixing function for maintaining the output of the determination signal.

When each sensor unit receives the external input signal from the host control apparatus 42, the sensor unit executes the external input function defined in the sensor unit. In the example of FIG. 13, the sensor units 30-1, 30-2 execute the output fixing function for always turning on the output. Thereby, the sensor units 30-1, 30-2 always turn on and output the determination signal regardless of the amount of received light thereafter obtained by the sensor units. On the other hand, the sensor units 30-3, 30-4 have the output fixing function for maintaining the determination signal that is output when the external input signal is received. In other words, regardless of the amount of received light thereafter obtained, the control units of the sensor units 30-3, 30-4 maintain and always output the determination signal that is output when the external signal is received. In the example of FIG. 13, the determination signal is OFF when the sensor unit 30-3 receives an external input signal. Accordingly, the determination signal indicating an OFF state is maintained. On the other hand, the determination signal is ON when the sensor unit 30-4 receives an external input signal. Accordingly, the determination signal indicating an ON state is maintained. In the present embodiment, the output of the sensor units 30-1, 30-2 are fixed in the ON state. Alternatively, an output fixing function for fixing the output in the OFF state may be arranged.

The sensor unit usually operates according to the detection value. Accordingly, there may be a case where the user cannot control the output of a sensor unit during a test run of a manufacturing line or a local operation check in units of blocks, which is inconvenient for the user. For example, in a case where the user wants to check the operation of the manufacturing line with the detection signal of the sensor unit 30-1 being in the ON state, the user does not have to place an object or a hand so as to turn on the output of the sensor unit 30-1 if the above-described output fixing function is used. The output fixing function can fix the output of the sensor unit 30-1 in the ON state regardless of, the amount of received light. As described above, virtual object detection states are achieved by controlling the output of each sensor unit, which enhances the efficiency in debugging and designing a system in a manufacturing line.

In particular, the present embodiment is arranged with the output maintaining function included in the output fixing function. The output maintaining function is to maintain the output of the determination signal of each sensor unit that is output when an external input signal is received. Accordingly, the efficiency in designing a system in a manufacturing line can be enhanced, and when a certain abnormality occurs in the manufacturing line, the output of each sensor unit can be fixed to this state. Therefore, the cause of the malfunction can be efficiently investigated. In particular, in a connected sensor system including a plurality of coupled sensor units, determination signal of sensor units are combined, and blocks constituting the entire manufacturing line can be subjected to complicated control. However, if a certain abnormality occurs in such a connected sensor system, it is difficult for the system designers to investigate the cause of the abnormality. Under such circumstances, the above-explained output fixing function can maintain an output state of each sensor unit to a state where the abnormality occurred, even if the state of the manufacturing line has changed since the abnormality occurred. Therefore, the above-explained output fixing function can achieve a significant effect for debugging the entire control system.

The external input function includes the zero-shift function in addition to the above-explained output fixing function, the preset function, and sleep functions such as the light-emission OFF function and the display OFF function. Such functions can be individually activated in respective sensor units, or can be activated at a time in all the sensor units. Accordingly, the host control apparatus 42 can cause each sensor unit connected to the network unit 10 to execute an external input function at any timing based on a designed program and an input given by another sensor system. Therefore, it is possible to flexibly respond to the needs and the purpose of the users. In the present embodiment, an external input signal is input to each sensor unit via the serial transmission line 41. Alternatively, each sensor unit may be attached with an input line, and the external input signal may be input via the input line from the network unit 10.

In the connected sensor system according to each of the above-described embodiments, a transparent-type photoelectric sensor unit is employed. Alternatively, other types of sensor units may be employed such as a reflective-type photoelectric sensor unit, a proximity sensor unit, and the like. The present invention can be applied to various kinds of sensor units for outputting determination signals based on detection signals.

In the explanation of the present embodiment, the sixteen sensor units are connected to the network unit. Alternatively, the connected sensor system may include any number of sensor units connected to the network unit 10.

In the present invention, the external input request region 14*a* is arranged in the cyclic communication memory 14*a* of the network unit 10. Accordingly, an external input can be easily given to each sensor unit only by storing an external input signal to a corresponding memory in the host control apparatus 42 without designing any communication command and without making complicated wirings between the host control apparatus 42 and the network unit 10.

Further, there are the plurality of operation modes for changing the data size and the data allocation of the cyclic communication memory 14*a* of the network unit 10, and the user can switch the operation mode. Therefore, the cyclic communication can be executed with the communication load and the response speed suitable for the needs and the purpose of the user.

Further, the output fixing function is arranged as the external input function, and the output of each sensor unit can be controlled without relying on the detection value, so that a virtual detection state can be achieved. Therefore, there are advantageous effects such as enhancing the efficiency in debugging and designing a system in a manufacturing line.

What is claimed is:

1. A connected sensor system comprising:
    a network unit for communicating with a host control apparatus via a field bus; and
    a plurality of sensor units connected to the network unit, the each sensor unit obtaining a detection value according to a physical amount detected from an object to be detected, the sensor unit outputting a determination signal upon comparing the detection value with a previously-defined threshold value,
    the connected sensor system being constituted by coupling the sensor units with each other, wherein
    the network unit includes:
        a host communication interface for connecting to the field bus;
        a cyclic communication memory for storing data for performing cyclic communication for sharing data with the host control apparatus via the host communication interface, the cyclic communication memory including a transmission memory region which includes a determination signal region storing determination signals obtained from the sensor units and a reception memory region including external input memory regions for giving external input signals to the sensor units, wherein the external input memory regions respectively correspond to the each sensor unit;
        a sensor setting information memory for storing setting information which is capable of being read and written by the host control apparatus through message communication;
        a sensor communication interface for communicating with each sensor unit coupled with the network unit; and
        a control unit for executing the cyclic communication with the host control apparatus, as a result of the cyclic communication, the control unit transmitting the external input signal stored in the external input memory region to each sensor unit via the sensor communication interface, and executing the message communication with the host control apparatus to read and write the sensor setting information stored in the sensor setting information memory, and wherein
    the each sensor unit includes:
        a setting information memory for storing a setting of an external input function executed when the external input signal is received, wherein the external input function includes at least one of a zero-shift function for shifting the detection value to zero, a preset function for adjusting the detection value to a predetermined value, and an output fixing function for fixing the determination signal; and
        a control unit for receiving the external input signal transmitted from the network unit and executing the external input function stored in the setting information memory.

2. The connected sensor system according to claim 1 further comprising a unit for switching, via the sensor communication interface, a partial monitor mode for storing the determination signal to the transmission memory region of the cyclic communication memory and a full monitor mode for storing the detection value of each sensor unit in addition to the determination signal to the transmission memory region of the cyclic communication memory.

3. The connected sensor system according to claim 1, further comprising a unit for switching whether the external input memory region is allocated in the reception memory region of the cyclic communication memory.

4. The connected sensor system according to claim 1, wherein the output fixing function fixes an output of the determination signal regardless the comparison result between the detection value and the threshold value as the external input function, wherein the control unit of the sensor unit executes the output fixing function when the external input signal is received.

5. The connected sensor system according to claim 4, wherein the control unit of the sensor unit fixes the output of the determination signal obtained when the external input signal is received.

6. The connected sensor system according to claim 1, wherein the sensor unit includes an operation unit for selecting the external input function executed when the external input signal is received and a display unit for displaying a setting screen for selecting the external input function, and wherein the control unit of the sensor unit detects that the sensor unit is connected to the network unit and displays the setting screen.

7. A network unit used for a connected sensor system, wherein the connected sensor system includes:
   the network unit for communicating with a host control apparatus via a field bus; and
   a plurality of sensor units connected to the network unit, the each sensor unit obtaining a detection value according to a physical amount detected from an object to be detected, the sensor unit outputting a determination signal upon comparing the detection value with a previously-defined threshold value,
   the connected sensor system being constituted by coupling the sensor units with each other, wherein
   the network unit includes:
      a host communication interface for connecting to the field bus;
      a cyclic communication memory for storing data for performing cyclic communication for sharing data with the host control apparatus via the host communication interface, the cyclic communication memory including a transmission memory region which includes a determination signal region storing determination signals obtained from the sensor units and a reception memory region including external input memory regions for giving external input signals to the sensor units, wherein the external input memory regions respectively correspond to the each sensor unit;
      a sensor setting information memory for storing setting information which is capable of being read and written by the host control apparatus through message communication;
      a sensor communication interface for communicating with each sensor unit coupled with the network unit; and
      a control unit for executing the cyclic communication with the host control apparatus, as a result of the cyclic communication, the control unit transmitting the external input signal stored in the external input memory region to each sensor unit via the sensor communication interface, and executing the message communication with the host control apparatus to read and write the sensor setting information stored in the sensor setting information memory, and wherein the each sensor unit includes:
      a setting information memory for storing a setting of an external input function executed when the external input signal is received, wherein the external input function includes at least one of a zero-shift function for shifting the detection value to zero, a preset function for adjusting the detection value to a predetermined value, and an output fixing function for fixing the determination signal; and
      a control unit for receiving the external input signal transmitted from the network unit and executing the external input function stored in the setting information memory.

8. A plurality of sensor units connected to a network unit, wherein the network unit includes:
   a host communication interface for connecting to a field bus;
   a cyclic communication memory for storing data for performing cyclic communication for sharing data with the host control apparatus via the host communication interface, the cyclic communication memory including a transmission memory region which includes a determination signal region storing determination signals obtained from the sensor units and a reception memory region including external input memory regions for giving external input signals to the sensor units, wherein the external input memory regions respectively correspond to the each sensor unit;
   a sensor setting information memory for storing setting information which is capable of being read and written by the host control apparatus through message communication;
   a sensor communication interface for communicating with each sensor unit coupled with the network unit; and
   a control unit for executing the cyclic communication with the host control apparatus, as a result of the cyclic communication, the control unit transmitting the external input signal stored in the external input memory region to each sensor unit via the sensor communication interface, and executing the message communication with the host control apparatus to read and write the sensor setting information stored in the sensor setting information memory, wherein
   the each sensor unit obtains a detection value according to a physical amount detected from an object to be detected, the sensor unit outputting a determination signal upon comparing the detection value with a previously-defined threshold value, and wherein
   the each sensor unit includes:
   a setting information memory for storing a setting of an external input function executed when the external input signal is received, wherein the external input function includes at least one of a zero-shift function for shifting the detection value to zero, a preset function for adjusting the detection value to a predetermined value, and an output fixing function for fixing the determination signal; and
   a control unit for receiving the external input signal transmitted from the network unit and executing the external input function stored in the setting information memory.

* * * * *